(12) United States Patent
Chou et al.

(10) Patent No.: US 8,032,329 B2
(45) Date of Patent: Oct. 4, 2011

(54) METHOD AND SYSTEM TO MONITOR, DEBUG, AND ANALYZE PERFORMANCE OF AN ELECTRONIC DESIGN

(75) Inventors: Chien-Chun Chou, Saratoga, CA (US); Stephen W. Hamilton, Pembroke Pines, FL (US); Drew E. Wingard, Palo Alto, CA (US); Pascal Chauvet, San Mateo, CA (US)

(73) Assignee: Sonics, Inc., Milpitas, CA (US)

( * ) Notice: Subject to any disclaimer, the term of this patent is extended or adjusted under 35 U.S.C. 154(b) by 370 days.

(21) Appl. No.: 12/204,156

(22) Filed: Sep. 4, 2008

(65) Prior Publication Data

US 2010/0057400 A1 Mar. 4, 2010

(51) Int. Cl.
*G06F 11/30* (2006.01)
*G06F 9/44* (2006.01)
*G06F 9/45* (2006.01)

(52) U.S. Cl. ............................ 702/182; 717/104; 703/22
(58) Field of Classification Search .................. 702/182; 717/104, 124; 703/22
See application file for complete search history.

(56) References Cited

U.S. PATENT DOCUMENTS

| | | | |
|---|---|---|---|
| 5,948,089 | A | 9/1999 | Wingard et al. |
| 6,182,183 | B1 | 1/2001 | Wingard et al. |
| 6,330,225 | B1 | 12/2001 | Wingard et al. |
| 6,505,260 | B2 | 1/2003 | Chin et al. |
| 6,578,117 | B2 | 6/2003 | Weber |
| 6,662,251 | B2 | 12/2003 | Brock et al. |
| 6,976,106 | B2 | 12/2005 | Tomlinson et al. |
| 7,149,829 | B2 | 12/2006 | Weber et al. |
| 7,165,094 | B2 | 1/2007 | Weber et al. |
| 2004/0210696 | A1 | 10/2004 | Meyer et al. |
| 2007/0162268 | A1 | 7/2007 | Kota et al. |
| 2008/0005713 | A1 | 1/2008 | Singh et al. |
| 2008/0133489 | A1 | 6/2008 | Armstead et al. |
| 2009/0150857 | A1* | 6/2009 | Srinivasan et al. ............ 717/104 |
| 2010/0057400 | A1 | 3/2010 | Chou et al. |

OTHER PUBLICATIONS

Drew Wingard, Sonics, Inc., "Sonics SOC Integration Architecture", P1500 Presentation, Jan. 28, 1999, pp. 1-25.
Wolf-Dietrich Weber, Sonics, Inc., "Efficient shared DRAM Subsystems for SOC's", Systems on IC's www.sonicsinc.com, Copyright 2001, Sonics, Inc., pp. 1-6.
OCP International Partnership, "Open Core Protocol Specification", Release 1.0 OCP-IP Confidential, Document Revision 1.1.1, Copyright 2001, pp. 184 total.
Alan, Kamas, The Systemc OCP Models, An Overview of the SystemC Models for the Open Core Protocol, 2004, pp. 1-30.
Anssi Haverinen, et al, White Paper for SystemC (TM) based SoC Communication Modeling for the OCP (TM) Protocol, V1.0, Oct. 14, 2002, pp. 1-39.

* cited by examiner

*Primary Examiner* — Bryan Bui
(74) *Attorney, Agent, or Firm* — Rutan & Tucker, LLP

(57) ABSTRACT

Various methods and apparatuses are described that provide instrumentation and analysis of an electronic design. A performance monitoring apparatus may be located on an interconnect of a fabricated integrated circuit. An event measurement module (EM) includes an event generator sub-module that generates monitoring events and event measurements associated with transactions between initiator intellectual property (IP) cores and target IP cores over the interconnect. The EM further includes a software visible register block that provides software access for controlling the EM on which one or more transactions to monitor and to configure one or more parameters associated with that transaction to track. The EM further includes a filtering sub-module that selects transactions to be monitored based on information received from the software. The performance counter module aggregates events and event measurements received from the EM into quantities of performance metrics associated with transactions between the IP cores over the interconnect.

25 Claims, 10 Drawing Sheets

METHOD AND SYSTEM TO MONITOR, DEBUG, AND ANALYZE PERFORMANCE OF AN ELECTRONIC DESIGN

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to electronic design automation. An aspect is related to monitoring and analyzing an electronic design with a hardware performance monitor.

BACKGROUND OF THE INVENTION

Many electronic designs are written at a register-transfer level (RTL) description of a circuit or system in a hardware description language. Generally, a RTL description describes what intermediate information (i.e. information stored between clock cycles in an electronic circuit) is stored in registers, where it is stored within the design, and how that information moves through the design as it operates. The RTL description of an electronic design is a functional description at least one level of abstraction higher than the individual gate layout of the electronic design system (e.g., gate-level implementation/Netlist). The RTL description fully and explicitly describes virtually all of the logic and sequential operations of the circuit. RTL descriptions are commonly written in standard languages such as Verilog or VHDL and are intended for logic synthesis and mapping with a commercial logic synthesizer.

One prior approach for performance analysis of an electronic design may include using a hardware performance monitor located at a fixed location such as in a processor or in a chipset connected to a system bus that is located within the electronic design. The hardware performance monitor can be monitoring on chip in silicon or with a RTL description as described above. The hardware performance monitor has a limited number of fixed non-configurable parameters to be monitored. These prior approaches are not able to quickly and efficiently monitor and analyze various parameters associated with electronic design performance early in the design cycle resulting in a longer design cycle and slower time to market for the design.

SUMMARY OF THE INVENTION

Various methods and apparatuses are described for a performance monitoring/debugging apparatus that includes an event measurement module communicatively coupled to a performance counter module. In one embodiment, the performance monitoring/debugging apparatus is located on an interconnect of a fabricated integrated circuit. The event measurement module includes an event generator sub-module that generates monitoring events and event measurements associated with transactions between initiator intellectual property (IP) cores and target IP cores over the interconnect of the fabricated integrated circuit. The event measurement module further includes a first software visible register block that provides software access for controlling the event measurement module on which one or more transactions to monitor and to configure one or more parameters associated with that transaction to track. The event measurement module further includes a filtering sub-module that selects transactions to be monitored based on information received from the software.

The performance counter module aggregates events and event measurements received from the event measurement module into quantities of performance metrics associated with transactions between initiator IP cores and target IP cores over the interconnect. The performance counter module communicatively couples to the event measurement module to form the performance monitoring/debugging apparatus that is located on the interconnect of the fabricated integrated circuit.

The performance monitoring/debugging apparatus provides an on chip, programmable solution for monitoring and debugging various parameters including latency or occupancy, FIFO queue utilization, and bandwidth of transactions occurring between initiator IP cores and target IP cores over the interconnect.

BRIEF DESCRIPTION OF THE DRAWINGS

The drawings refer to embodiments of the invention in which.

Figure 1:
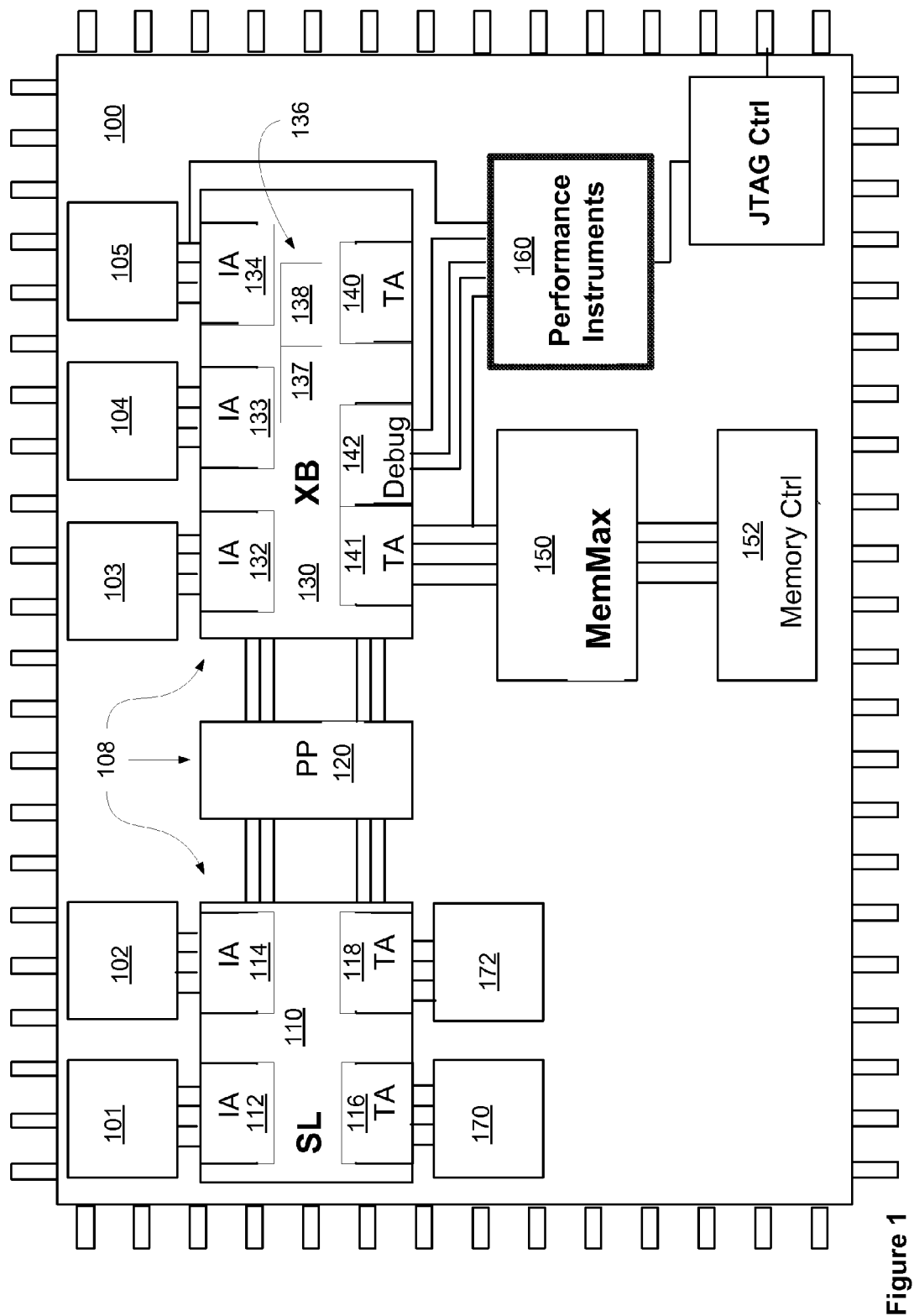
FIG. 1 illustrates a block diagram of an embodiment of a fabricated integrated circuit with IP cores coupled with an interconnect having a performance monitoring/debugging apparatus.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as a first instance of a transactor, may be made. However, the specific numeric reference should not be interpreted as a literal sequential order but rather interpreted that the first instance of a transactor is different than a second instance of a transactor. Thus, the specific details set forth are merely exemplary. The specific details may be varied from and still be contemplated to be within the spirit and scope of the present invention.

In general, various methods and apparatuses are described for a performance monitoring/debugging system that includes target agents associated with target IP cores and initiator agents associated with initiator IP cores. The initiator and target IP cores are communicatively coupled via an interconnect of the performance monitoring/debugging system which includes a performance monitor that is configurable after design time of the performance monitoring/debugging system. The performance monitor monitors transactions between the initiator IP cores and target IP cores.

The performance monitor includes an event measurement module communicatively coupled to a performance counter module. The event measurement module includes an event generator sub-module that generates monitoring events and event measurements associated with transactions between initiator intellectual property (IP) cores and target IP cores over the interconnect of the fabricated integrated circuit. The event measurement module further includes a first software visible register block that provides software access for controlling the event measurement module on which one or more transactions to monitor or debug and to configure one or more parameters associated with that transaction to track. The event measurement module further includes a transaction filtering sub-module that selects transactions to be monitored or debugged based on information received from the software.

The performance counter module aggregates events and event measurements received from the event measurement module into quantities of performance metrics associated with transactions between initiator IP cores and target IP cores over the interconnect. The performance monitor/debugger hardware may be a software configurable structure built on the interconnect and based on programmability and communication among three functional sub modules, a performance event generator which detects raw events specific to the HW to be monitored such as an OCP interface, a filtering module which allows only certain of these events to be monitored such as filtering certain OCP transfers or transactions based upon transfer attributes, and a hardware performance counter module.

An architectural phase of the electronic design system can be optimized with a low level RTL model that can collect data and provide analysis based on using RTL software instrumentation test points and performance analysis units that analyze data collected by the RTL test points. In one embodiment, these RTL test points are instrumented into being RTL instances which are configured to be coded at an abstraction level in RTL to be synthesized by a logic synthesis tool.

As discussed, many electronic designs are written at a register-transfer level (RTL) description of a circuit or system in a hardware description language. Generally, a RTL description describes what intermediate information (i.e. information stored between clock cycles in an electronic circuit) is stored in registers, where it is stored within the design, and how that information moves through the design as it operates. The RTL description of an electronic design is a functional description at least one level of abstraction higher than the individual gate layout of the electronic design system (e.g., gate-level implementation/Netlist). The RTL description fully and explicitly describes virtually all of the logic and sequential operations of the circuit. RTL descriptions are commonly written in standard languages such as Verilog or VHDL and are intended for logic synthesis and mapping with a commercial logic synthesizer.

FIG. 1 illustrates a block diagram of an embodiment of a fabricated integrated circuit (IC) with IP cores coupled with an interconnect having a performance monitoring/debugging apparatus. The fabrication IC 100 includes initiator IP cores 101-105, target IP cores 150, 152, 160, 170, and 172 with these cores being communicatively coupled with an interconnect module 108 that includes interconnect sub portions 110, 120, and 130. Interconnect sub portion 110 includes initiator agents 112 and 114 as well as target agents 116 and 118.

Interconnect sub portion 130 includes initiator agents 132-134, target agents 140 and 141, a debug module 142, and the performance monitoring/debugging apparatus 136. The performance monitoring/debugging apparatus 136 includes an event measurement module 137 that is communicatively coupled to a performance counter module 138. In one embodiment, the performance monitoring/debugging apparatus 136 is located on the interconnect sub portion 130 of the fabricated IC 100. The performance monitor/debugger apparatus 136 is located internal to the interconnect to monitor parameters of transactions occurring at that location internal to the interconnect. In other embodiments, the performance monitoring apparatus 136 is located at any location on the interconnect 108 including within an initiator and/or target agent. Instead of the fabricated interconnect being black box where the initiator core inputs a transaction and out comes the transaction at the target core, the transaction's progress within the interconnect can be monitored based on given parameters at each location internal to the interconnect 108 as well as through out the overall interconnect 108 (i.e., specific points within the fabricated interconnect can be examined).

The event measurement module 137 generates monitoring events and event measurements associated with transactions between initiator intellectual property (IP) cores and target IP cores over the interconnect 108 of the fabricated integrated circuit 100. The event measurement module 137 provides software access for controlling the event measurement module. The event measurement module 137 selects transactions to be monitored or debugged. Software writes to the software visible register block to control which transactions and what to look at and configures one or more parameters associated with that transaction to track.

The performance counter module 138 aggregates events and event measurements received from the event measurement module 137 into quantities of performance metrics associated with transactions between initiator IP cores and target IP cores over the interconnect 108.

The performance monitoring/debugging apparatus 136 provides an on chip solution for monitoring various parameters including queue utilization and bandwidth of transactions occurring between initiator IP cores and target IP cores over the interconnect. The performance monitoring/debugging apparatus 136 is a hardware unit that may be instantiated within initiator and target agents of interconnects to provide real time monitoring in hardware of the associated OCP socket.

The performance monitoring/debugging apparatus 136 is able to measure occupancy, accept latency, FIFO queue utilization, and bandwidth for any selected OCP phase. It is able to measure a single selected latency that is either critical first word read latency, critical first word write latency, total burst read latency, total burst write latency, read data interval, write data interval, or the duration of blocking or non-blocking semaphores. The performance monitoring/debugging apparatus 136 can perform both average and worst case measurements simultaneously on the same set of selected transactions.

In one embodiment, target IP core 150 is a memory scheduler for accessing off chip memory (not shown) such as dynamic random access memory (DRAM) with the target IP core 152 being a memory controller. In certain embodiments, IP core 160 is a performance instrument module for on chip debugging of the IC 100.

In order to limit the gate count impact of the performance monitoring/debugging apparatus 136, it is defined with a significant amount of configurability, so that only the capabilities needed will be present in the hardware. Much of the configuration may be derived from the use context (e.g., OCP 2 socket parameters). Some of the configuration must be user selected (specified intentions). The user configuration is primarily aimed at specifying run-time programmability. A minimally configured and minimally programmable performance monitor is approximately 3000 gates. A maximally configured and maximally programmable performance monitor may be as much as 8000 gates.

Figure 2:
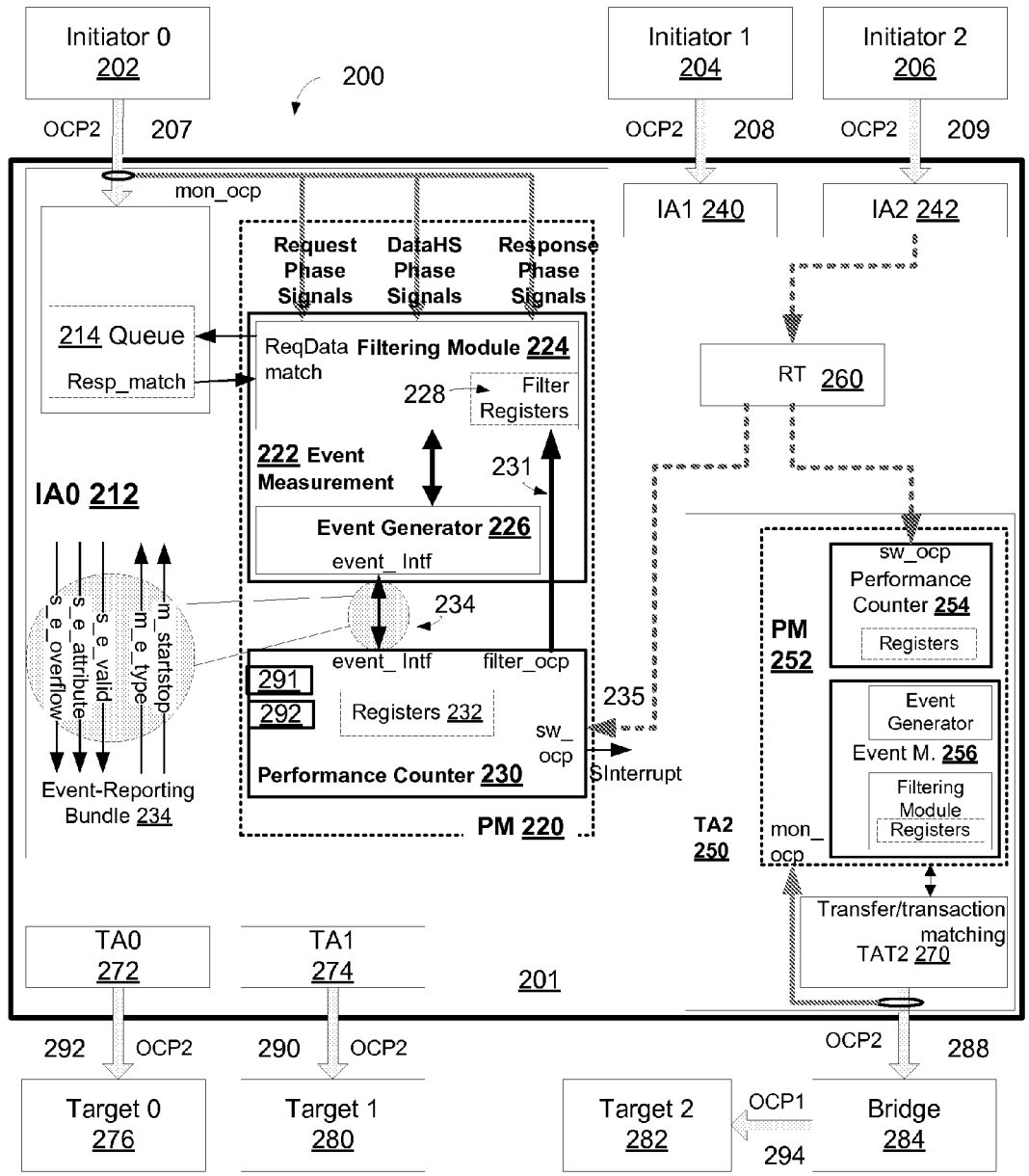
FIG. 2 illustrates a block diagram of another embodiment of a fabricated integrated circuit with IP cores coupled with an interconnect having one or more performance monitors.

FIG. 2 illustrates a block diagram of an embodiment of a performance monitoring/debugging system with IP cores coupled with an interconnect. The performance monitoring/debugging system 200 includes target agents 272, 274 and 250 associated with target IP cores 276, 280, and 284/282, respectively, and initiator agents 212, 240, and 242 associated with initiator IP cores 202, 204, and 206, respectively. An internal interconnect Register Target (RT) is also displayed as 260. The initiator and target IP cores, as well as the interconnect RT, are communicatively coupled via an interconnect 201 and links 207-209, 288, 290, 292, and 294 (e.g., OCP1, OCP2 links). The performance monitoring system 200 includes two performance monitors 220 and 252 that are configurable after design time of the performance monitoring system 200. The performance monitors 220 and 252 reside at the initiator side and the target side, respectively; and they monitor transactions between the initiator IP cores and target IP cores. The performance monitors 220 and 252 can be programmed after being synthesized into hardware to measure a filtered subset of transactions occurring between the initiator and target IP cores.

The performance monitor 220 includes an event measurement module 222 that is communicatively coupled via link 234 and link 231 to a performance counter module 230. The event measurement module 222 includes an event generator sub-module 226 that generates monitoring events and event measurements associated with transactions between the initiator IP cores and the target IP cores over the interconnect 201 of the performance monitoring system 200 that may be a fabricated integrated circuit if the system 200 is synthesized by a logic synthesis tool. The event measurement module 222 further includes a first software visible filter register block 228 that provides software access for controlling the event measurement module.

The event measurement module 222 further includes a filtering sub-module 224 that selects transactions to be monitored with software visible filter registers 228 via link 231 under the control of the performance counter module 230. In one embodiment, the filtering sub-module 224 is configured to select transactions to be monitored at run-time based on at least one of transaction type, command type, thread identification, tag identification, address space, and associated request information. A transaction may need to pass all of these filters in order to be measured.

The performance counter module 230 also aggregates events and event measurements received from the event measurement module 222 via link 234 into quantities of performance metrics associated with transactions between initiator IP cores and target IP cores over the interconnect 201.

The performance counter module 230 also includes a software visible register block 232 to provide software access for controlling the performance counter module. Performance monitoring is controlled by software, for instance, through using the interconnect interface 235 of the performance monitor 220. The performance monitors 220 and 252 contain software visible register blocks (228 and 232 for 220 and Registers shown in 254 and 256 for 252). When a performance monitor is instantiated within an agent, the associated register block must be mapped into the address space of the interconnect instance. This provides software access to setup, trigger, and re-configure the performance monitor to make specific performance measurements, and to access the results of those measurements. The performance counter module 230 is configured to access and control the software visible register block 228 in order to monitor desirable transfers and transactions between the initiator IP cores and target IP cores. The performance counter module is also configured to access and control the software visible register block 232 in order to determine the type of events that are measured from those desirable transfers and transactions. The performance counter module 230 can be further configured through register block 232 to measure a set of latency, occupancy, and bandwidth quantities associated with transaction performance of the IP cores.

Software registers of the performance monitor 220 are split into two sets and stored at the register block 232 and at register block 228, respectively. The performance counter module 230 uses an internal (OCP 2) connection 231 to access/control filtering registers 228 in order to monitor only desirable OCP transfers and transactions. The performance counter module 230 also controls what type of events for those desirable OCP transfers and transactions are measured through the use of the "Event-Reporting" bundle's (234) control signals m_startstop and m_e_type based on register settings described in 232. The event measurement module 222 reports events of the specified type and event measurements to the performance counter module 230. The Event-Reporting bundle 234 is used between the performance counter module 230 and the event measurement module 222 (by its Event Generator sub module 226) for communicating events and attributes by using the three event signals: s_e_valid, s_e_attribute, and s_e_overflow.

In some embodiments, the performance counter module 230 further includes a counter 291 (e.g., number of event counter, STATUS.SAMPLES) to determine how many events of a specified event type are measured, a second counter 292

(e.g., time interval counter, INTERVAL.CYCLES) to determine a measurement interval by calculating an elapsed time in terms of clock cycles for a measurement, and a third counter (e.g., activity period counter, RESULTS.ACTIVE) to determine a number of clock cycles during the measurement interval that the specified event type was present.

In one embodiment, the performance monitor 220 is instantiated within the initiator agent IA0 (212) and a performance monitor 252 is instantiated within the target agent TA2 (250). The performance monitor 220 may receive request signals, data signals, and response signals between the initiator 0 (202) and the initiator agent IA0 (210) via link 207. The performance monitor 252 may receive request signals, data signals, and response signals between the target agent TA2 (250) and the target bridge 284 via link 288.

The performance monitor 220 also contains a set of software controllable registers used to specify the type of events to be measured, and registers to control the measurements. These registers are: the COMMAND, STATUS, RESULTS, and INTERVAL registers. In certain embodiments, the performance counter module 230 further includes a register block 232 having a command register that specifies and control performance measurements associated with the transactions, a status register that monitors ongoing measurements, a results register to store measurement results, and an interval register to store measurement intervals.

Each performance monitor instantiates a performance counter module for the basic hardware/software interface and control mechanisms that it provides. The registers of the performance counter modules are the first (lowest addressed) registers in the associated performance monitor. Each performance monitor also includes request filtering hardware and event generator/measurement hardware that is specific to the HW to be monitored. A set of programming registers listed in Table 1 are defined as an example to control the desired transaction filtering for the OCP 2 based HW block diagram displayed in FIG. 2.

TABLE 1

Performance Monitor Register Blocks

| Address Offset | Register (configuration parameter) | Description |
|---|---|---|
| Performance Counter Module Registers (232) | | |
| 0x000 | COMMAND | Specify and control performance measurements |
| 0x008 | STATUS | Monitor an ongoing measurement |
| 0x010 | RESULTS | Measurement results |
| 0x018 | INTERVAL | Measurement interval |
| 0x020~0x0F8 | Reserved | |
| Optional Performance Monitor Filter Registers (228) | | |
| 0x100 | ADDRESS (parameter address_filter = 1) | Start of address range (MAddrSpace/MAddr) filter region |
| 0x108 | BOUND (parameter address_filter = 1) | End (bound) of address range (MAddrSpace/MAddr) filter region |
| 0x110 | THREADS (parameter thread_filter = 1) | MThreadID selection filter control |
| 0x118 | TAGS (parameter tag_filter = 1) | MTagID selection filter control |
| 0x120 | REQINFO (parameter reqinfo_filter = 1) | MReqInfo filter control |
| 0x128~0x3F8 | Reserved | |

The COMMAND register is for specifying what type of event is to be measured and how many such events should be recorded (when the event-set style measurement is selected). The register is also used to start and stop measurements, and to control performance monitor interrupts.

TABLE 2

Performance Monitor Registers: COMMAND Register

| Bits | Field | Range | Default | R/W | Exp | Ret | Description |
|---|---|---|---|---|---|---|---|
| 63:19 | Reserved | | | | | | |
| 18 | INTEN | Full | 0x0 | RW | No | No | Interrupt enable |
| 17:16 | CMD | Full | 0x0 | RW | No | No | Start counting or timed/SW stop commands |
| 15:13 | Reserved | | | | | | |
| 12:08 | ETYPE | Full | 0x00 | RW | No | No | (OCP) Event type to be measured |
| 07:06 | Reserved | | | | | | |
| 05:00 | EVENTS | Full | 0x00 | RW | No | No | The number of events to be measured, when the event-set measurement scheme is selected. Excess 1 coding is used. |

In addition to the SAMPLES counter field, the STATUS register also includes an ANY_OVER bit field (indicating at least one counter has overflowed when it is set to 1), the END_STATUS and RUN_STATUS field (indicating the status of the active measurement), and software interrupt status SINT bit. The SINT status bit is set to 1 when the COMMAND.INTEN register field is set to 1 (see Table 2) and the active measurement has completed. When the SINT status bit has a value of 1, a performance monitor module's outgoing sw_OCP SInterrupt signal (such as the sw_OCP 235 shown in FIG. 2) will also be asserted. The SINT bit can be written to 0 to clear its state, which will also de-assert its corresponding SInterrupt signal.

In addition to the ACTIVE counter field, the RESULTS register has three other fields: (1) a ACTIVE_OVER bit field indicating whether the ACTIVE counter is overflowed or not; (2) a MAX field to record the maximum value of the s_e_attribute signal monitored for an event so far; and (3) a MAX_OVER bit field indicating a recording overflow for the MAX field.

In addition to the CYCLES counter field, the INTERVAL register also has a CYCLES_OVER bit field indicating whether the CYCLES counter is overflowed or not.

The performance monitor can be used by software in either of 2 ways: to measure event sets; or to measure time intervals. The measurement style is controlled by software using the COMMAND register. The measurement styles are described in the following.

For an event-set measurement, a type of event and the number of events to be measured are specified first. Then, the performance monitor is triggered to search for the number of events, find the number of events, and then measure the number of events. The activity period is indeterminate, but the measurements are precise, and are collected for a set of sampled events. The performance monitor can generate a software interrupt at the end of a measurement. If the performance monitor never reaches the number of events specified, software must be used to manually terminate the current active measurement.

For a time-interval measurement, a type of event and a time period to be measured are specified first. Then, the performance monitor is triggered to count and measure all events of the specified type that occur in the time interval. The activity period is determinate, but the measurements are imprecise as events that span the boundaries of the measurement interval are only partially measured. The performance monitor can generate a software interrupt at the end of a measurement.

Figure 3:
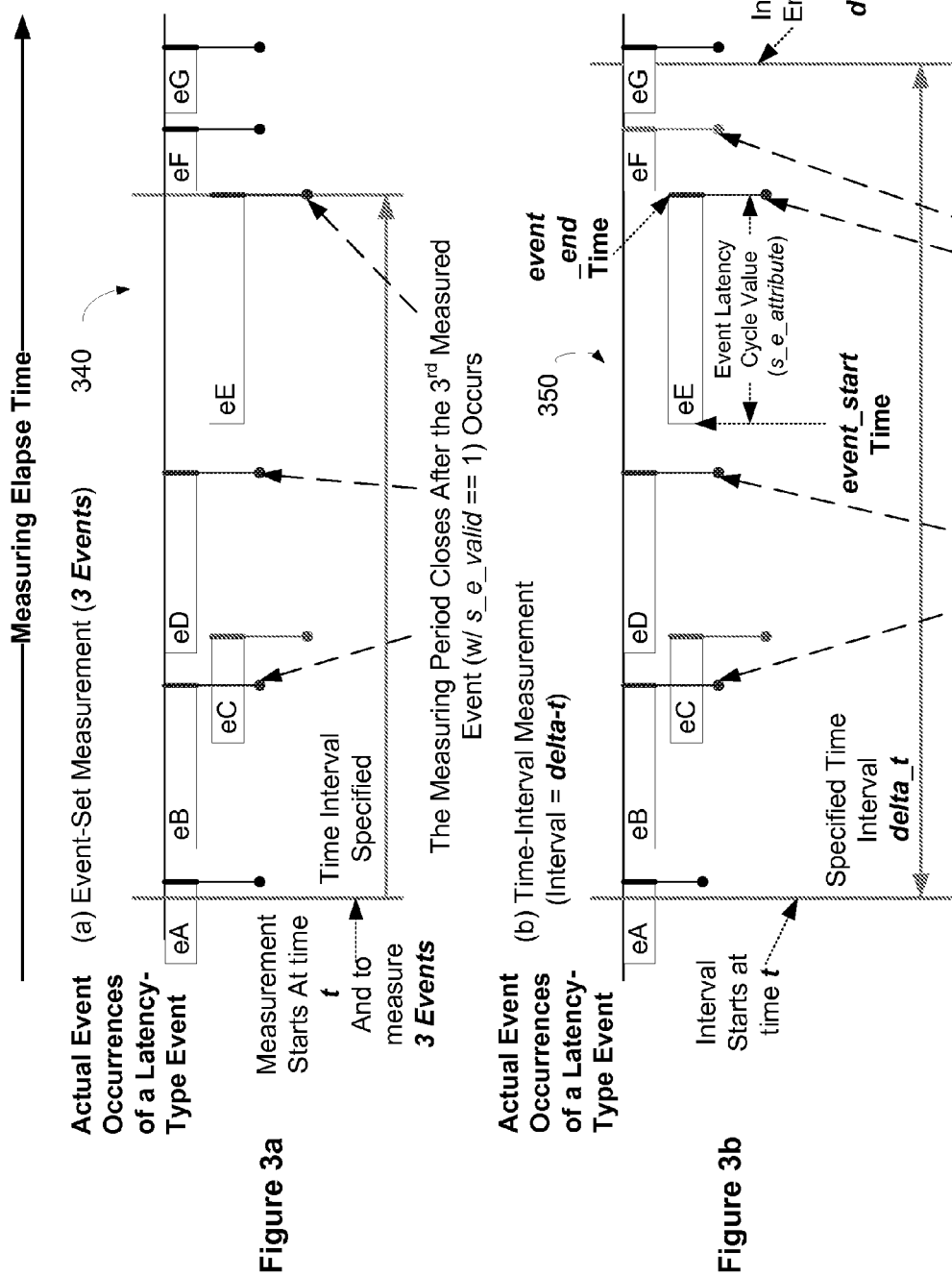
FIG. 3a illustrates a timing diagram of an embodiment of measuring a latency event using an event set measurement of a performance monitor.
FIG. 3b illustrates a timing diagram of an embodiment of measuring a latency event using an timing interval measurement of a performance monitor.

FIG. 3a illustrates a timing diagram of an embodiment of measuring a latency event using an event set measurement of a performance monitor. FIG. 3b illustrates a timing diagram of an embodiment of measuring a latency event using a timing interval measurement of a performance monitor.

FIGS. 3a and 3b show an example of a measurement of a latency-type event, using both styles of measurements discussed above. FIGS. 3a and 3b show the event occurrences during the measuring elapse time from left to right. A total of 7 events occur and they are labeled as eA, eB, eC, eD, eE, eF, and eG. Note that, as illustrated for event eE in FIGS. 3a and 3b, each latency event has an event_start time and an event_end time (in the same clock cycle or at different cycles). The "Latency" of the event is represented by "event_end time–event_start time+1" cycles, and is passed from event measurement module to performance counter module at the end of each event as the s_e_attribute signal's quantity.

When the event-set style of measurement 340 is selected as illustrated in FIG. 3a and the number of events to be measured is set to three, only latency events eB, eD, and eE will be collected because these events are whole, non-overlapping latency events occurring between time t and the event end time of the $3^{rd}$ non-overlapping event eE. Note that the event start time of event eC is overlapping with the duration of event eB and therefore eC is ignored. All quantity results of performance metrics are calculated based on these three events.

When the time-interval style of measurement 350 is selected, a time interval delta_t must be specified. All whole, non-overlapping latency events occurring between time t and t+delta_t will be collected. Latency event eC is omitted because its event start time overlaps events eB as illustrated in FIG. 3b. As shown in FIG. 3b, events eB, eD, eE, and eF are used to calculate performance metrics. Note that events eA and eG do not occur wholly within the delta_t time interval. Thus, they are ignored.

Occupancy and bandwidth measurements are measured for all activity of the OCP 2 socket since these activities each holds its own resource that does not overlap with each other in time. Multiple latency events may be presented at once on an OCP 2 socket. The performance monitor measures latency by repeatedly sampling one event at a time to save silicon area and to reduce hardware complexity. Therefore, not all latency events will be measured, i.e., only non-overlapping events are monitored and measured.

For instance, assuming the latency-type event shown in FIG. 3a and 3b represents the total burst read latency (i.e., from the $1^{st}$ cycle of the read request phase to the last cycle of the read response phase of a read burst transaction) monitored by the performance monitor 220 of FIG. 2, then the overlapping of two events eB and eC indicates these two bursts are interleaved for some period of time. Since at most one latency event can be measure at a time, the later-started event eC is ignored by the performance module 220 during the event-set style measurement 340 and during the time-interval style measurement 350.

Figure 4:
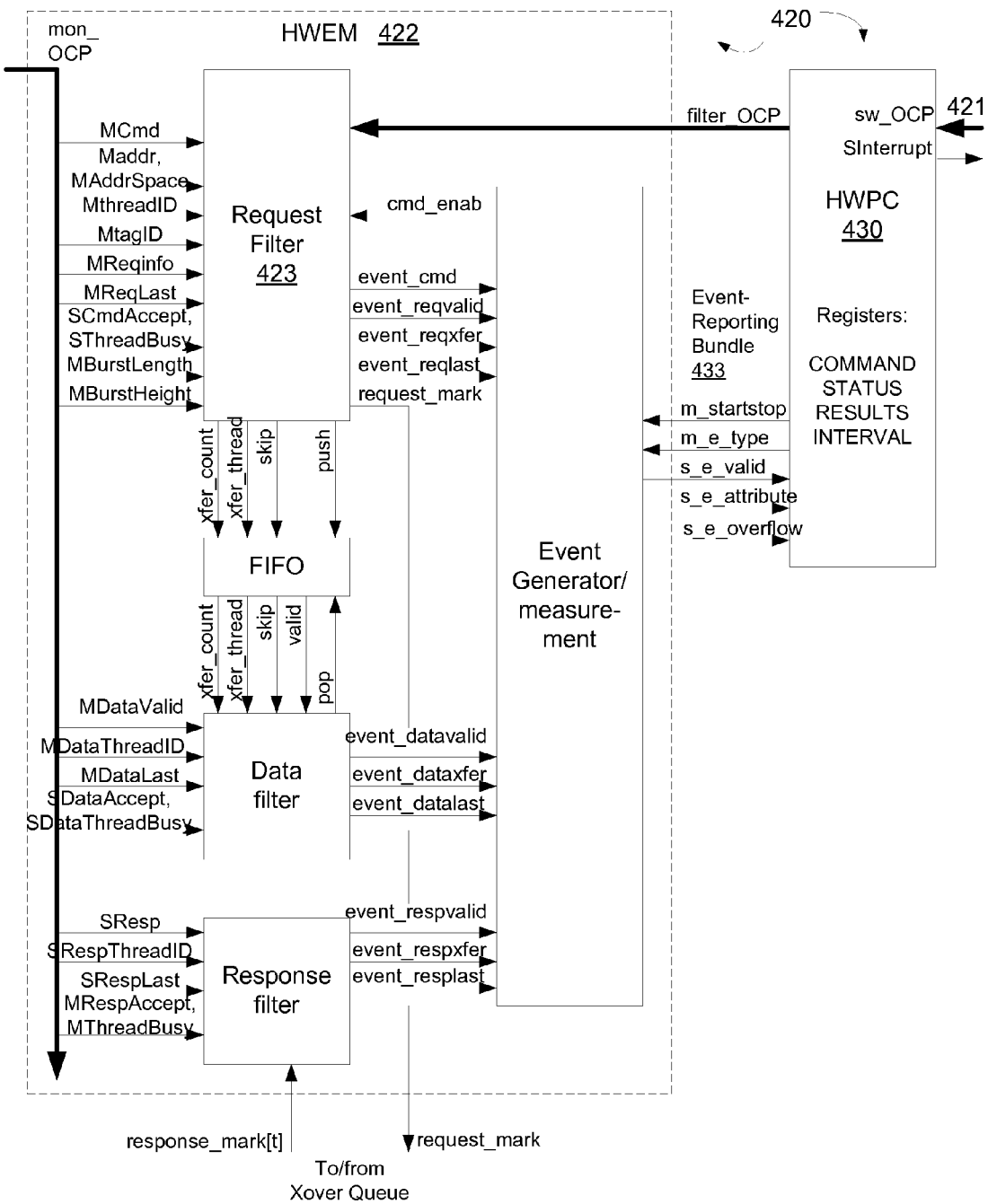
FIG. 4 illustrates a block diagram of an embodiment of a performance monitor that monitors transactions between IP cores.

FIG. 4 illustrates a block diagram of an embodiment of a performance monitor that monitors transactions between IP cores. As depicted in FIG. 4 the performance monitor module 420 is actually a combination of the hardware performance counter module (HWPC) 430, and a hardware event measurement module (HWEM) 422 that is tailored to OCP events. Software accesses the performance monitor module 420 through the sw_OCP port 421 on the hardware performance counter module 430. So functional operation is determined largely by the hardware performance counter module 430. The hardware event measurement module 422 is visible to software only in that it provides registers to specify the type of request/transaction filtering that is to be used during the measurements.

User configuration of the performance monitor module 420 is only that needed by the hardware performance counter module 430 and hardware event measurement module 422 to implement the software visible registers.

The performance monitor module 420 can be used by software in either of 2 ways—to measure event sets; or to measure time intervals. In either case the first step, while the performance monitor module 420 is stopped, is to establish which transactions will be measured. This is done by writing to the filter registers 423. Once the transaction filters are programmed, the hardware performance counter module 430 registers may be used to trigger the measurement actions.

In order to measure over a set of events, the COMMAND register (inside 430) is written. The COMMAND.EVENTS field specifies the number of events to be measured. The COMMAND.ETYPE field specifies the quantity to be measured according to the Table listed below.

TABLE 3

COMMAND.ETYPE Event Types and Quantities of OCP Performance Metrics

| ETYPE | Quantities (OCP Performance Metrics) | OCP MCmd (MRMD or SRMD) | event_start Cycle | event_end Cycle and Event Reporting Cycle | The s_e_attribute signal value | Notes - see paragraph [0062] |
|---|---|---|---|---|---|---|
| 0x00 | Reserved | | | | | |
| 0x01 | Request BW | All | $1^{st}$ cycle of a request | Last cycle of the same request | Constant 1 | [0062] # 1 |
| 0x02 | Write BW | WR, WRNP, WRC | $1^{st}$ cycle of MData | Last cycle of the same MData | Constant 1 | [0062] # 1 |
| 0x03 | Read BW | RD | $1^{st}$ cycle of read response | Last cycle of the same response | Constant 1 | [0062] # 1 |

TABLE 3-continued

COMMAND.ETYPE Event Types and Quantities of OCP Performance Metrics

| ETYPE | Quantities (OCP Performance Metrics) | OCP MCmd (MRMD or SRMD) | event_start Cycle | event_end Cycle and Event Reporting Cycle | The s_e_attribute signal value | Notes - see paragraph [0062] |
|---|---|---|---|---|---|---|
| 0x04 | Blocking semaphore occupancy | RDEX | 1st cycle of request | Last cycle of request | event_end – event_start + 1 | [0062] #2 |
| 0x05 | Lazy semaphore occupancy | RDL | 1st cycle of request | Last cycle of request | event_end – event_start + 1 | [0062] #2 |
| 0x06 | All semaphore occupancy | RDEX, RDL | 1st cycle of request | Last cycle of request | event_end – event_start + 1 | [0062] #2 |
| 0x07 | Critical read latency (RL & RqRpL) | RD | 1st cycle of 1st request of a burst | 1st cycle of 1st response of the same burst | event_end – event_start + 1 | [0062] #3 [0062] #4 |
| 0x08 | Critical write latency (WL & RqDL) | WR, WRNP | 1st cycle of 1st request of a burst | 1st cycle of 1st data of the same burst | event_end – event_start + 1 | [0062] #3 [0062] #4 |
| 0x09 | Critical MRMD read latency (RqRpL) | MRMD RD | 1st cycle of 1st request of a burst | 1st cycle of 1st response of the same burst | event_end – event_start + 1 | MRMD only[0062] #3 [0062] #4 |
| 0x0A | Critical MRMD write latency (RqDL) | MRMD WR, MRMD WRNP | 1st cycle of 1st request of a burst | 1st cycle of 1st data of the same burst | event_end – event_start + 1 | MRMD only[0062] #3 [0062] #4 |
| 0x0B | Total burst read latency (total BL) | RD | 1st cycle of 1st request of a burst | Last cycle of last response of the same burst | event_end – event_start + 1 | [0062] #3 [0062] #4 |
| 0x0C | If write response is enabled: Total burst write latency (total BL) Otherwise: write burst latency (write BL) | WR, WRNP | 1st cycle of 1st request of a burst | If write response is enabled: last cycle of last response of the same burst Otherwise, last cycle of last MData of the same burst | event_end – event_start + 1 | [0062] #3 [0062] #4 |
| 0x0D | Read interval (RDI) | RD | 1st cycle of a non-last response (e.g., the $i^{th}$ response) | 1st cycle of the $(i + 1)^{th}$ response | event_end – event_start + 1 | [0062] #3 [0062] #4 |
| 0x0E | Write interval (WDI) | WR, WRNP | 1st cycle of a non-last MData (e.g., the $i^{th}$ MData) | 1st cycle of the $(i + 1)^{th}$ MData | event_end – event_start + 1 | [0062] #3 [0062] #4 |
| 0x0F | Precise read burst length | RD | 1st cycle of 1st request of a burst | 1st cycle of 1st request of a burst | MBurstLength | [0062] #5 [0062] #6 |
| 0x10 | Precise write burst length | WR, WRNP | 1st cycle of 1st request of a burst | 1st cycle of 1st request of a burst | MBurstLength | [0062] #5 [0062] #6 |

TABLE 3-continued

COMMAND.ETYPE Event Types and Quantities of OCP Performance Metrics

| ETYPE | Quantities (OCP Performance Metrics) | OCP MCmd (MRMD or SRMD) | event_start Cycle | event_end Cycle and Event Reporting Cycle | The s_e_attribute signal value | Notes - see paragraph [0062] |
|---|---|---|---|---|---|---|
| 0x11 | Blocking semaphore burst latency (RDEXL) | RDEX, WR/WRNP | 1st cycle of 1st RDEX request | Last cycle of matching WR/WRNP request | event_end − event_start + 1 | [0062] #3 [0062] #4 |
| 0x12 | Lazy semaphore burst latency (RDLL) | RDL, WRC | 1st cycle of 1st RDL request | Last cycle of matching WRC request | event_end − event_start + 1 | [0062] #3 [0062] #4 |
| 0x13~0x1F | Reserved | | | | | |

The COMMAND.INTEN field specifies if an interrupt is desired at the conclusion of the measurement. The COMMAND.CMD field specifies a value of 0x2, to trigger start of a counted event-set measurement. The COMMAND.ETYPE field is presented directly to the hardware event measurement module 422 on the m_e_type signal of the Event-Reporting bundle 433.

In the cycle after the COMMAND write (of value 0x2), the performance monitor module 420 moves to the init state 552 (FIG. 5), where it stays for only a single cycle. In the init cycle, the STATUS register's STATUS.SAMPLES counter is set to 0, the STATUS.ANY_OVER bit is set to 0, the RESULTS register's RESULTS.MAX and RESULTS.ACTIVE values are set to 0 (including clearing RESULTS.MAX_OVER and RESULTS.ACTIVE_OVER), and the INTERVAL register's INTERVAL.CYCLES counter is set to 0 (and INTERVAL.CYCLES_OVER cleared). The performance monitor module 420 (FIG. 4) then moves to the search state 554 (FIG. 5).

Figure 5:
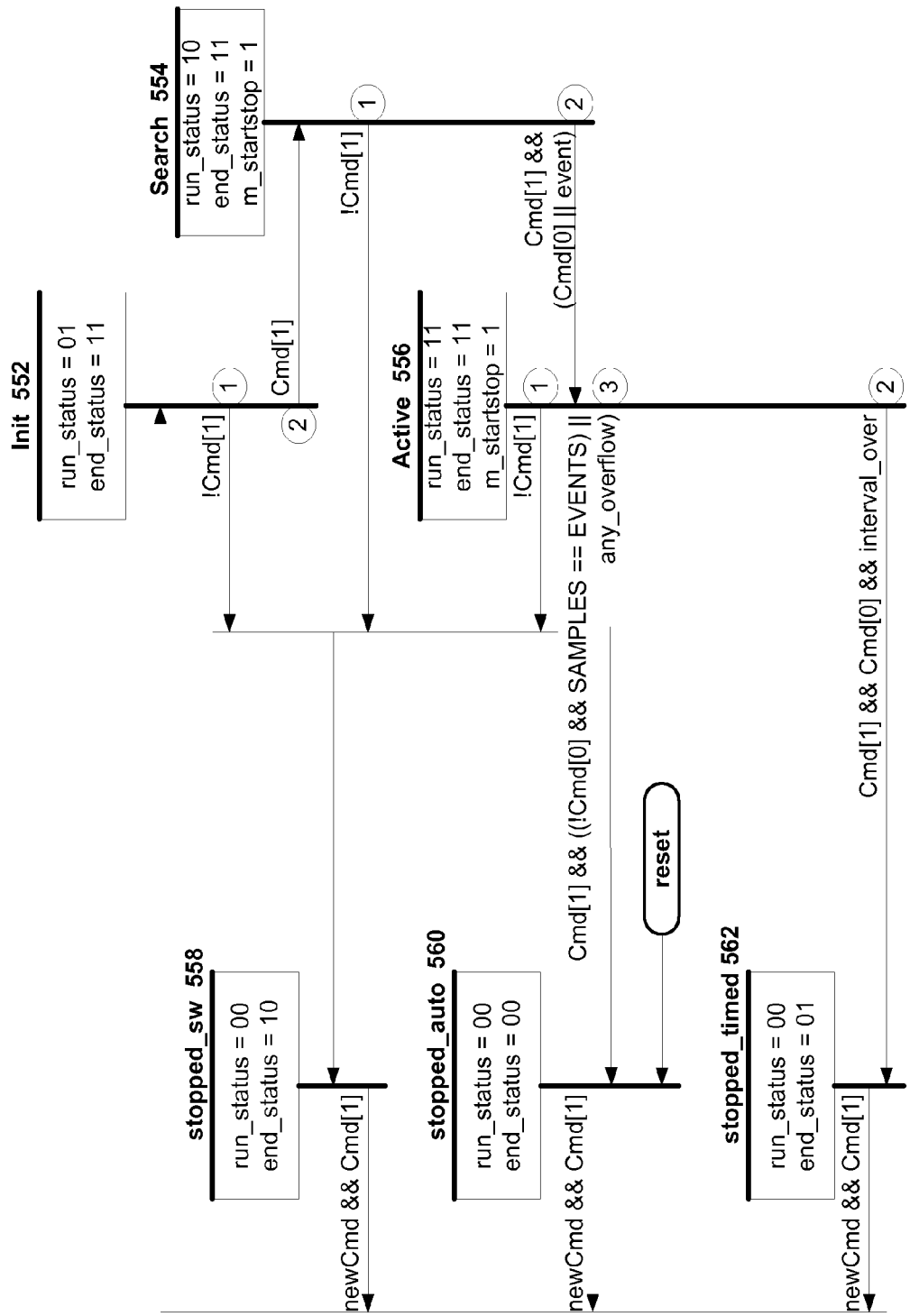
FIG. 5 illustrates a control state machine for an embodiment of operations of a hardware performance counter of a performance monitor.

FIG. 5 illustrates a state transition diagram of an embodiment of operations of a hardware performance counter of a performance monitor. In the search state 554, the Event-Reporting bundle's m_startstop signal 433 (FIG. 4) is asserted to the hardware event measurement module 422 (FIG. 4) so that event monitoring begins. The performance monitor module 420 (FIG. 4) stays in the search state 554 until the first event is indicated on the s_e_valid signal 433 (FIG. 4). The performance monitor module 420 (FIG. 4) then moves to the active state 556. If the COMMAND register is written with a stop command (COMMAND.CMD=0x0 or 0x1) before the first event, the performance monitor module 420 (FIG. 4) returns immediately to the stopped_sw state 558.

While in the active state 556, the INTERVAL register's INTERVAL.CYCLES counter is incremented each cycle. Also, in each cycle where the s_e_valid signal 433 (FIG. 4) is asserted, the STATUS register's STATUS.SAMPLES counter is incremented, and the s_e_attribute signal's quantity (433 of FIG. 4) is added to the RESULTS.ACTIVE counter, and the s_e_attribute signal's value is also written to the RESULTS.MAX field if it is greater than the current MAX value. If the s_e_overflow signal bit (433 of FIG. 4) is set, then both the RESULTS register's RESULTS.MAX_OVER and RESULTS.ACTIVE_OVER fields are set. Eventually when the s_e_valid signal is asserted and STATUS.SAMPLES is advanced, and the STATUS.SAMPLE value equals the specific value set in COMMAND.EVENTS, the performance monitor advances to the stopped_auto state 560. If the COMMAND register is written with a stop command (COMMAND.CMD=0x0 or 0x1) before STATUS.SAMPLES equals COMMAND.EVENTS, the performance monitor module 420 (FIG. 4) returns immediately to the stopped_sw state 558.

When the performance monitor leaves the active state 556 and enters any of the stopped states 558-562, the m_startstop signal 433 (FIG. 4) is de-asserted so the hardware event measurement module 422 (FIG. 4) ceases to report events, and the INTERVAL.CYCLES counter stops advancing. This leaves all components of the measurement static so they can be accessed by software.

In order to measure over a time interval, the INTERVAL register must be written with the twos complement of the desired interval before the measurement is started. The COMMAND register is written to start the measurement. The EVENTS field will be ignored by performance monitor module 420 (FIG. 4). The ETYPE field specifies the quantity (the s_e_attribute signal column) to be measured according to Table 3. The COMMAND.INTEN field specifies if an interrupt is desired at the conclusion of the measurement. The COMMAND.CMD field specifies a value of 0x3, to trigger start of a time -interval measurement. The COMMAND.ETYPE field is presented directly to the hardware event measurement module 422 of FIG. 4 on the m_e_type signal 433.

In the cycle after the COMMAND write (of value 0x3), the performance monitor moves to the init state 552 (FIG. 5), where it stays for only a single cycle. In the init cycle 552, the STATUS.SAMPLES counter is set to 0, the STATUS.ANY_OVER bit is set to 0, the RESULTS.MAX and RESULTS.ACTIVE values are set to 0 (including clearing RESULTS.MAX_OVER and RESULTS.ACTIVE_OVER). The performance monitor then moves to the search state 554.

In the search state 554, m_startstop is asserted to the hardware event measurement module 422 (FIG. 4) so that event monitoring begins. Because COMMON.CMD bit 1 was written with a 1, the performance monitor module 420 (FIG. 4) stays in the search state 554 for only 1 cycle, and then moves to the active state 556.

While in the active state 556 INTERVAL.CYCLES is incremented each cycle. Also, in each cycle where the s_e_valid signal 433 (FIG. 4) is asserted, STATUS.SAMPLES is incremented, and the s_e_attribute signal's value (433 of FIG. 4) is added to RESULTS.ACTIVE, and the s_e_attribute value is written to RESULTS.MAX if it is greater than the current MAX value. If the s_e_overflow signal bit is set, then both RESULTS.MAX_OVER and RESULTS.ACTIVE_OVER are set. Eventually INTERVAL.CYCLES overflows to indicate the measurement interval has completed. When this happens, the performance monitor advances to the stopped_timed state 562. If the COMMAND register is written with a stop command (COMMAND.CMD=0x0 or 0x1) before INTERVAL.CYCLES overflows, the performance monitor returns immediately to the stopped_sw state 558.

When the performance monitor module 420 (FIG. 4) leaves the active state 556 and enters any of the stopped states 558-562, m_startstop is de-asserted so the hardware event measurement module 422 (FIG. 4) ceases to report events, and the INTERVAL.CYCLES counter stops advancing. This leaves all components of the measurement static so they can be accessed by software. Note that the value stored in the INTERVAL.CYCLES field is not the originally specified time interval.

The information below is related to the right-most "Notes" column of table 3. After each event-set or time-interval measurement, the performance monitor module 420 reaches a stopped state and leaves all measurements static waiting to be accessed by software. A software agent who knows the OCP data word size and operating frequency can access the performance monitor's registers to calculate desired performance metrics quantitatively. For instance, (1) when the COMMAND.ETYPE field is set to 0x01, 0x02, and 0x03 during the measurement, request, write, and read BW quantities, respectively, can be computed by the software agent using the formula: (STATUS.SAMPLES/INTERVAL.CYCLES)*bytes per OCP data word*OCP frequency; (2) when the COMMAND.ETYPE field is set to 0x04, 0x05, and 0x06 during the measurement, blocking semaphore, lazy semaphore, and all semaphore occupancy quantities, respectively, can be computed by using the formula: RESULTS.ACTIVE/INTERVAL.CYCLES; (3) when the COMMAND.ETYPE field is set to a value from 0x07 to 0x0E, 0x11, and 0x12 during the measurement, many average latency quantities can be computed by using the formula: RESULTS.ACTIVE/STATUS.SAMPLES; (4) when the COMMAND.ETYPE field is set to a value from 0x07 to 0x0E, 0x11, and 0x12 during the measurement, many worst latency quantities can be computed by using the formula: RESULTS.MAX; (5) when the COMMAND.ETYPE field is set to 0x0F and 0x10 during the measurement, average read and write burst length quantities, respectively, can be computed by using the formula: RESULTS.ACTIVE/STATUS.SAMPLES; and (6) when the COMMAND.ETYPE field is set to 0x0F and 0x10 during the measurement, worst read and write burst length quantities, respectively, can be computed by using the formula: RESULTS.MAX.

Figure 6A:
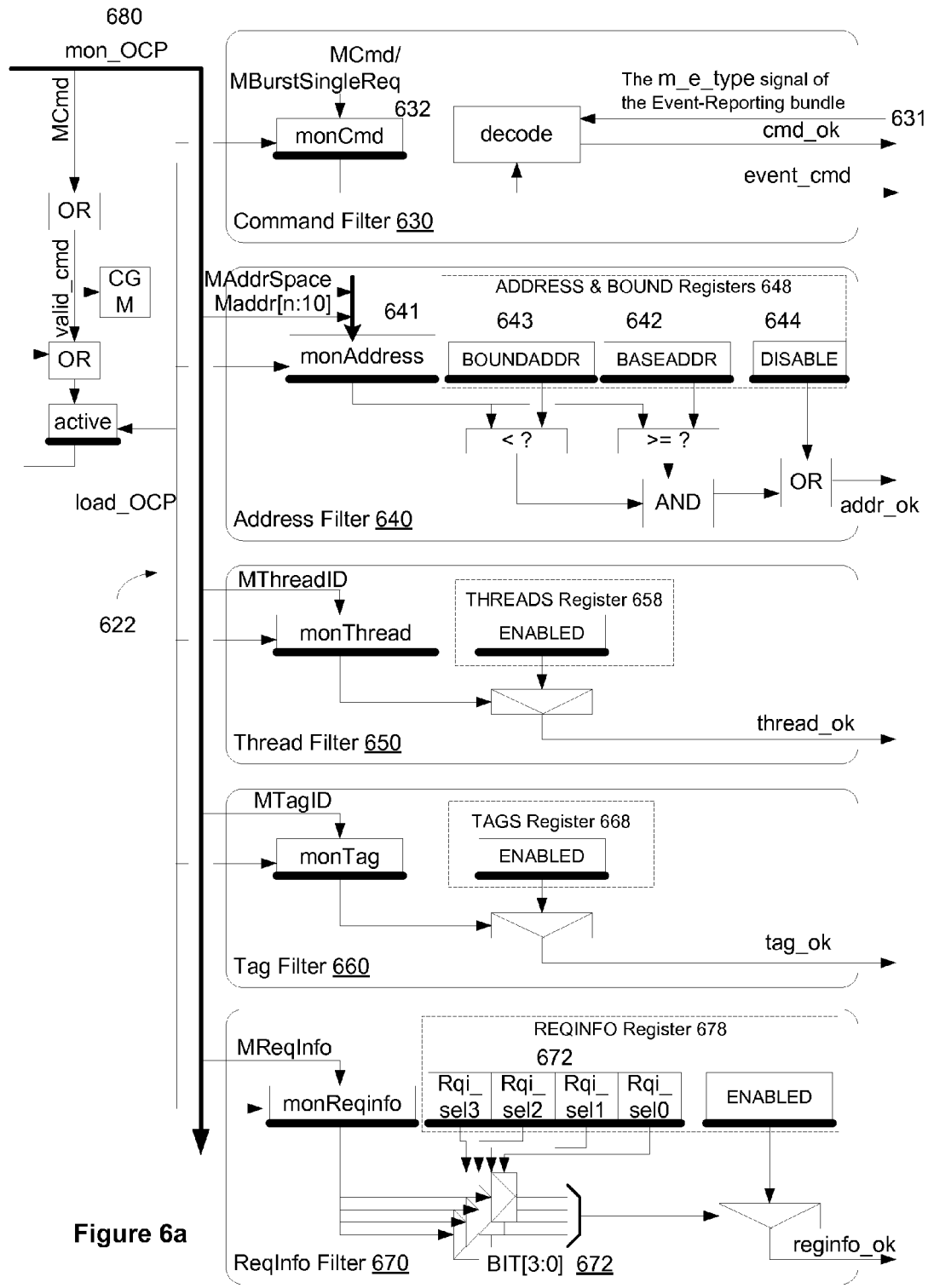
FIG. 6a illustrates a HW block diagram of an embodiment of operations of a OCP request filters of a performance monitor.

FIG. 6a illustrates a HW block diagram of an embodiment of operations of an OCP request filter of a performance monitor. The COMMAND.ETYPE field, for instance, enables measurement of request, data, and/or response phase occupancies or of latency events that start on one phase and end on another. All these events are measured within a transaction. The performance monitor can be configured and programmed so that not all transactions are subject to measurement. The performance monitor hardware event measurement module 622 only reports events on transactions that pass a set of filters. The filter set can include a command filter 630, an address filter 640, a threads filter 650, a tags filter 660, and a reqinfo filter 670. Filters are programmed by writing to the performance monitor filter registers: ADDRESS and BOUND 648, THREADS 658, TAGS 668, and REQINFO 678.

FIG. 6a shows the high-level block diagram of the filter operations provided by the hardware event measurement module 622 block. The command filter 630 is automatically programmed by the COMMAND.ETYPE field by utilizing the m_e_type signal of the Event-Reporting bundle 631. The "OCP MCmd" column in Table 3 (the $3^{rd}$ column from the left) indicates which commands, i.e., monCmd 632 (a concatenation of the mon_OCP 680 bundle's MCmd and MBurstSingleReq signals) are enabled for each of the measured quantities. The MBurstSingleReq signal can identify whether a multiple-request-phases-multiple-data-phases MRMD command or a single-request-phase-multiple-data-phases SRMD command is monitored.

The address filter 640 only permits transactions to be measured that have a request address that lies within a specified match region. The request address is assumed to be a concatenation of the mon_OCP (680) bundle's MAddrSpace and MAddr signals, i.e., monAddress 641, for the request. The match region is defined via starting and ending addresses represented by register fields ADDRESS.BASEADDR 642 and BOUND.BOUNDADDR 643, respectively. The request address must be greater than or equal to the starting address, and strictly less than the ending address. The ending address is called the bound address since it is basically just outside the match region. The start and bound addresses must have identical most-signification bits, corresponding to the address space to be matched. If the mon_OCP socket 680 has no MAddrSpace, then this requirement is removed. The start and bound addresses for the match region are aligned to 1K-byte boundaries.

The address filter 631 can be temporarily disabled by writing to the ADDRESS.DISABLE bit 644. While the filter is disabled, all requests are assumed to lie within the match region.

Programmability of the address filter is enabled by the write attributes on the BASEADDR and BOUNDADDR register fields. The performance monitor may be configured at design time by the SOC developer to not include the address filter block. The address filter block 640 can be configured out using the address_filter parameter. When the address filter is not present, all requests are assumed to lie within the match region (pass the filter).

When the address filter is present, its gate count cost is proportional to the width of the address fields. A 20-bit address width corresponds to approximately 1.2K gates.

The threads filter 650 only permits transactions to be measured that have a request thread that is enabled by the filter. The THREADS.ENABLED register field 651 has one enable bit for each thread. The mon_OCP bundle's request MThreadID must select a THREADS.ENABLED bit that is 1 in order to pass the filter.

Programmability of the threads filter is enabled by the write attributes on the THREADS register 658. The performance monitor may be configured at design time by the SOC developer to not include the threads filter block. The threads filter block 650 can be configured out using the thread_filter parameter. When the threads filter is not present, all requests are assumed to belong to an enabled thread (pass the filter).

When the threads filter is present, its gate count cost is proportional to the number of threads. A maximal socket with 16 threads corresponds to approximately 0.4K gates.

The tags filter 660 only permits transactions to be measured that have a mon_OCP 680 bundle's request tag (MTagID) that is enabled by the filter. The TAGS.ENABLED register field has one enable bit for each tag. The request MTagID must select a TAGS.ENABLED bit that is 1 in order to pass the filter.

Programmability of the tags filter is enabled by the write attributes on the TAGS register 668. The performance monitor may be configured at design time by the SOC developer to not include the tags filter block. The tags filter block 660 can be configured out using the tag_filter parameter. When the tags filter is not present, all requests are assumed to belong to an enabled tag (pass the filter).

When the tags filter is present, its gate count cost is proportional to the number of tags. A socket with 16 tags corresponds to approximately 0.4K gates.

The reginfo filter 670 only permits transactions to be measured that have a mon_OCP 680 bundle's request MReqInfo values that are enabled by the filter. The MReqInfo field can have a large number of bits. The filter allows a minimum of 1 and a maximum of 4 of the MReqInfo bits be extracted into a reqinfo vector (BIT[3:0] 671) for the purposes of filtering. REQINFO register fields, Rqi_sel0, 1, 2, and 3 (672) can each store a bit position to indicate a MReqInfo bit to be extracted into BIT bits 0, 1, 2, and 3, respectively.

The extracted reqinfo vector BIT[3:0] has a range of 2, 4, 8, or 16 values. The REQINFO.ENABLED field has the same width, so that there is one enable bit for each possible value of the reqinfo vector. REQINFO.ENABLED field has one enable bit for each reqinfo value. A request is passed by the filter if the enable bit selected by the reqinfo vector BIT[3:0] is a 1.

Programmability of the reginfo filter is enabled by the write attributes on the REQINFO register 678. The performance monitor may be configured at design time by the SOC developer to not include the reqinfo filter block. The reginfo filter block 670 can be configured out using the reqinfo_filter parameter. When the reqinfo filter is not present, all requests are assumed to have an enabled value on the selected MReqinfo bits (pass the filter).

When the reqinfo filter is present, its gate count cost is proportional to the number of MReqinfo bits used for filtering. A filter with the maximum of 4 reqinfo bits used for filtering corresponds to approximately 0.4K gates.

Figure 6B:
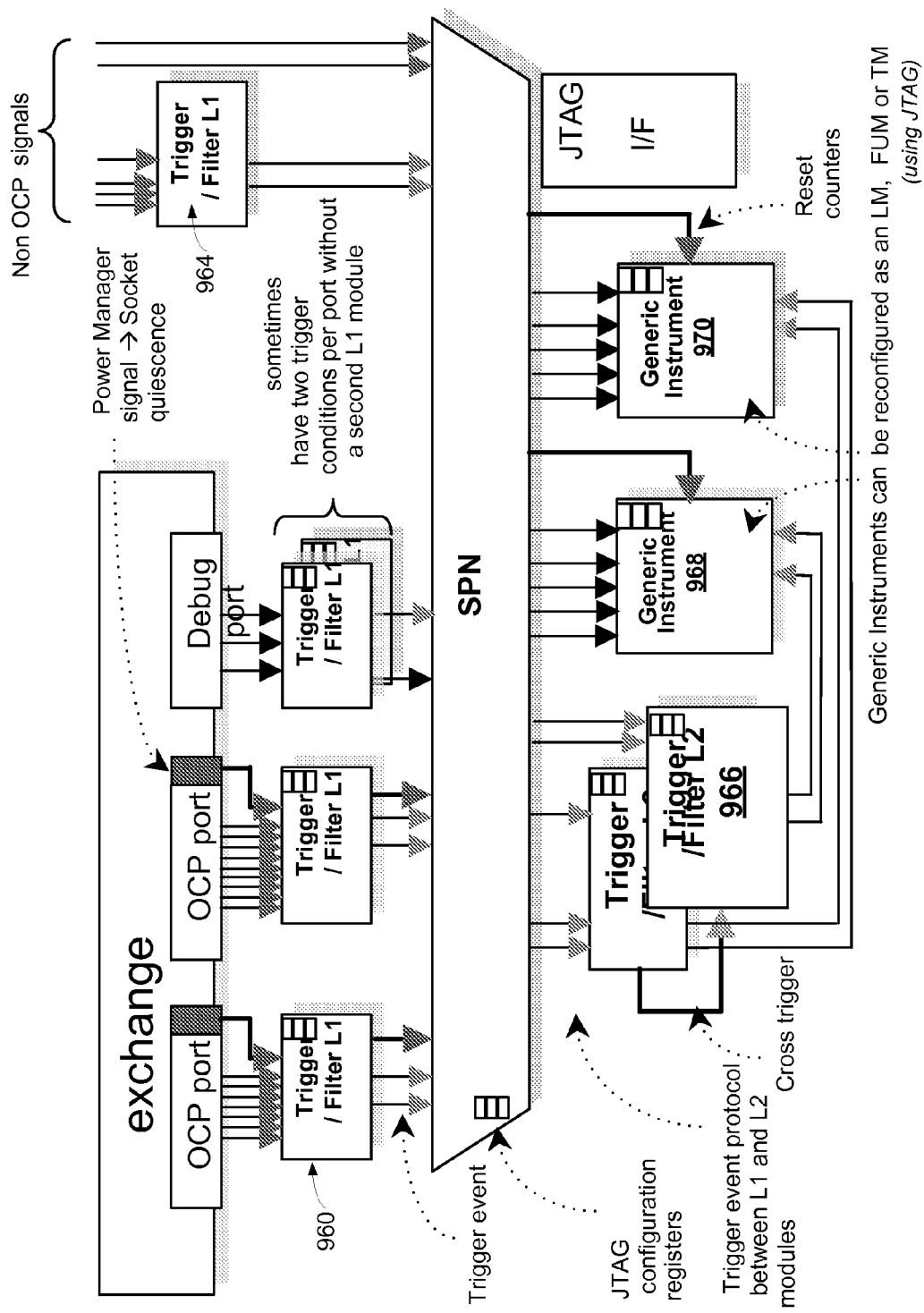
FIG. 6b illustrates a distributed and hierarchical architecture of the monitoring system including a L2 performance monitor module and one or more associated L1 event monitor modules.

FIG. 6b illustrates a distributed and hierarchical architecture of the monitoring system including a L2 performance monitor module and one or more associated L1 event monitor modules. Each L1 module, such as a first event monitor module 960, is a variant of an event measurement sub-module. Each L1 event monitor sub-module has protocol logic configured to understand a protocol and various signal lines used in an interconnect in the System on a Chip, so the logic can recognize one or more patterns occurring by data values carried in the signal lines, comparator logic to match these patterns when the pattern occurs, and communication logic configured to communicate to the L2 performance counter module that a monitored for event corresponding to the pattern has indeed occurred. Example first through forth L1 event monitor modules 960-964 are located at each socket/interface to the interconnect. Each L1 event monitor sub-module 960-964 communicates an input to the L2 performance counter module 966 located within the interconnect. The L2 performance counter module 966 reports to a first and a second generic instrument 968, 970 depending on the combination of input signals from the L1 event monitor modules 960-964.

As discussed, each L1 event monitor sub-module is a variant of an event measurement sub-module. Protocol related features are programmed into the logic kept in a L1 event monitor module. Each L1 event monitor module 960-964 is configured with logic to understand the protocol and various signal lines used in the interconnect such as an OCP based interconnect. Each L1 event monitor module 960-964 is configured with logic to understand what information data values on those signal lines conveys so the L1 event monitor module can recognize one or more patterns occurring by the data values carried in the signal lines. The patterns may merely include a data value on a single signal line but usually involve combinations of the data value(s) being carried on two or more of the signal lines, which when occurring in given sequence conveys that a specific event is occurring. The recognized event could be for example, the start of a burst read or write, the end of the burst, the round trip latency transactions are incurring, etc. The logic in the L1 module is programmed to monitor and match these patterns when the pattern occurs according to the protocol. Once a match occurs, then the logic of the L1 module will convey that this monitored for event has indeed occurred and communicates this information to a L2 performance counter module 966. The L2 performance counter module 966 is similar to a variant of a performance counter module in that the L2 module typically receives and aggregates communication signals from two or more individual L1 modules. The L2 module has logic programmed to look for patterns from the combination of signals coming from the distributed L1 event reporting modules. The combination of signals coming from the distributed L1 event reporting modules can convey system wide events occurring. The L2 could just output system wide performance metrics. However, the L2 module may also receive these inputs and the input signals match a pattern in the logic to trigger the L2 to communicate out that a given system wide event has occurred.

The L1 module may attach to a socket/interface the module monitors. The L1 will therefore represent the distributed part of the solution. The L1 module is responsible for tracking protocol events and reports them to the central L2 module. The programmed logic within the L1 module can vary drastically depending on the trigger or filter condition is being implemented. The L2 module will be the centralized and will also control the generic instrument. The generic instrument of receives the L2 module's trigger input and will also be centralized for either an interconnect exchange or similar instance of IP.

The L1 module has logic configured to search for one or more specific transactions by comparing the specific transaction payload values with values programmed by the user. Any number of interesting information from the OCP socket may be monitored for to cause a trigger to occur when found.

The L1 module also contains registers to store the reference pattern defining the trigger and filter conditions. The L1 module will also contain the logical comparators for the pattern matching search. The L1 module may contain additional circuitry as well to handle different configurations. The L1 module identifies the request phase and generates an event to be sent either to the L2 module or another component in the interconnect. As an optimization, a set of L1 modules cross triggering each other.

The Trigger/Filter L2 performance counter module 966 combines several trigger events coming from L1 modules. In order to keep the gate count as low as possible the L2 modules which will be shared for an interconnect exchange or located within the interconnect, the L2 module contains the state machines and counters necessary to correlate request and response and also the state machine to create the system level condition combining several L1 events. Two L2 modules should be able to cross trigger each other.

Each generic instrument 968, 970 has software visible registers that can be programmed by the user to trigger or monitor for specific protocol based events. The Generic instrument may contain time counters, event counters, measurement completion notification mechanisms such as an interrupt, and configuration and status registers.

In an embodiment, each L1 module, L2 module and generic instrument may have one or more software visible register blocks to provide software access for programming and controlling the type of protocol event monitored for in the case of L1 modules or system wide event monitored for in the case of L2 modules and generic instruments. Also the generic instruments can be programmed what kind of trigger, action, and reporting should occur once the monitored for condition(s) do occur.

Figure 6C:
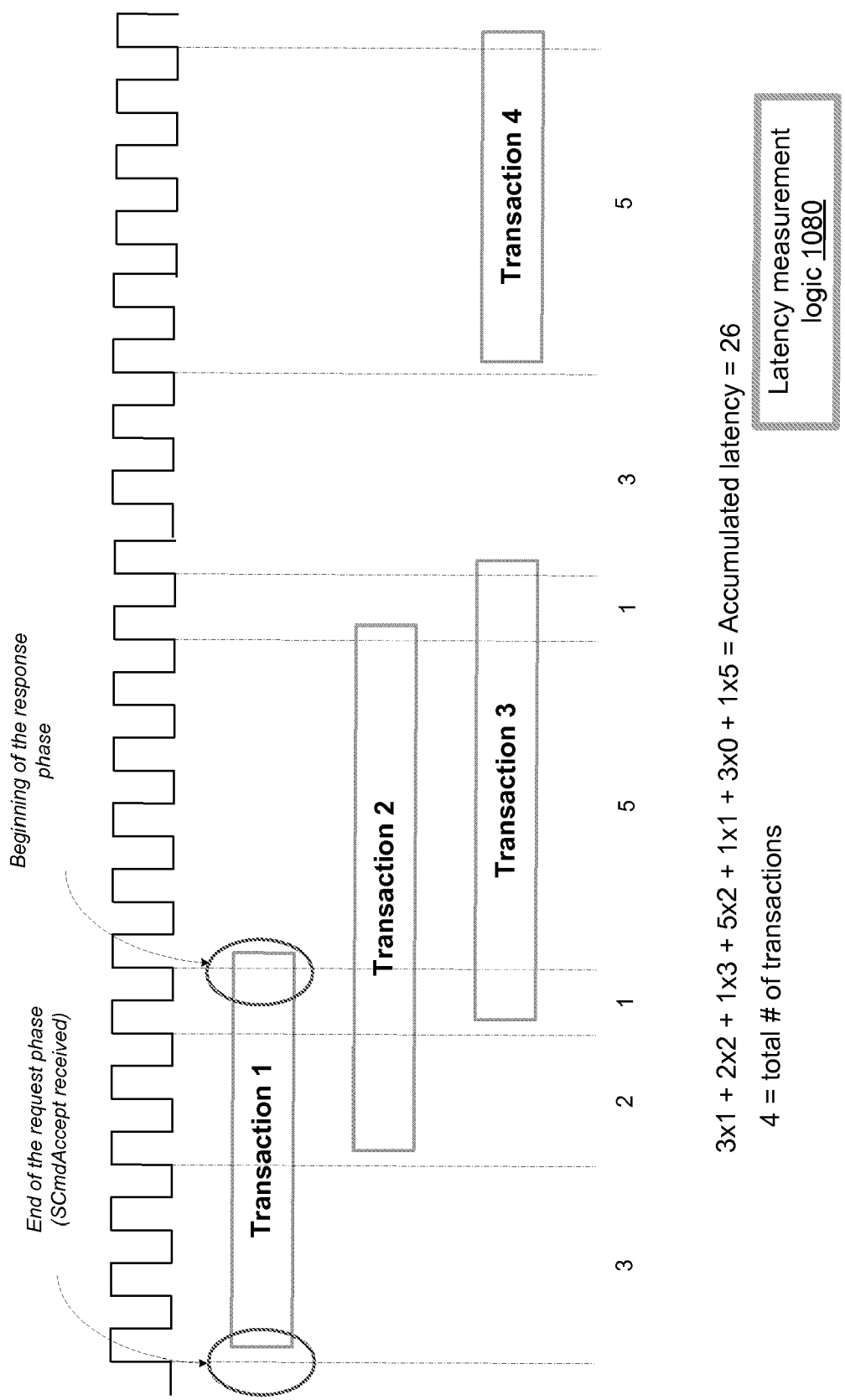
FIG. 6c depicts latency measurement logic and an approach for the actual average latency measurement.

FIG. 6c depicts latency measurement logic and an approach for the actual average latency measurement. Latency measurement logic 1080 also exists in the interconnect to make an average latency measurement. The latency measurement logic 1080 uses a method to actually measure on the fly the average request to response latency for very large number of transactions without doing estimations. In the example, the latency measurement logic 1080 measures average latency for four transactions. The latency measurement logic 1080 avoids matching requests to their corresponding responses. The latency measurement logic 1080 simplifies significantly the implementation as even large number of outstanding transactions is no longer a problem. The latency measurement logic 1080 may implement an algorithm as follows:

$$\text{Average latency} = \frac{\sum (L_n \times \mathit{InFlightTransactions})}{\mathit{TotalNumberOfTransactions}}$$

Where E stands for summing and Ln stands for latency/delay between two events and In flight transactions represents the currently started transactions but responses have not been received yet for those transactions and the total number of transactions represents the count of requests from the start of the first event measurement.

The table shows the average latency measured for the requests and responses, the number of transactions in flight, the accumulated latency for the transactions in flight since the beginning of this measurement and the total number of transactions included in this measurement.

| Latency measured | 3 | 2 | 1 | 5 | 1 | 3 | 5 |
|---|---|---|---|---|---|---|---|
| # of transaction "in flight" | 1 | 2 | 3 | 2 | 1 | 0 | 1 |
| Accumulated latency | 3 | 7 | 10 | 20 | 21 | 21 | 26 |
| Total # of transaction | 1 | 2 | 3 | 3 | 3 | 3 | 4 |

The latency measurement logic 1080 is configured to track the events marking the beginning and the end of any transaction. Both events can either start or stop the counter that measures the number clock cycles spent between the two consecutive events. The outstanding transaction counter has to be incremented at the beginning of each transaction. The outstanding transaction counter is then decremented when a end transaction event is detected. For the best accuracy, it may be safer to start the measurement when the outstanding transaction count is equal to zero. However, for measurements over very large number of transactions, the potential error resulting from starting or stopping the measurement in the middle of a pending transaction can be neglected. The latency measurement logic may further include an 8 bit counter to count the outstanding transactions (in flight), a larger counter to count the total number of transactions, and an accumulator for the latency. The latency measurement logic has configurable registers to allow the user to be able to define how many transactions have to be measured and what trigger condition can be expected.

The latency measurement logic, which is located in the interconnect in the system on chip, may be configured to make a throughput measurement and resource utilization measurement for two or more transactions without doing estimations. Also, the latency measurement logic may be configured to make an average latency measurement of average request to response latency for two or more transactions without doing estimations.

The status register indicates the total number of transactions and the accumulated latency for those transactions. Each transaction includes one or more requests and one or more optional responses.

Figure 7:
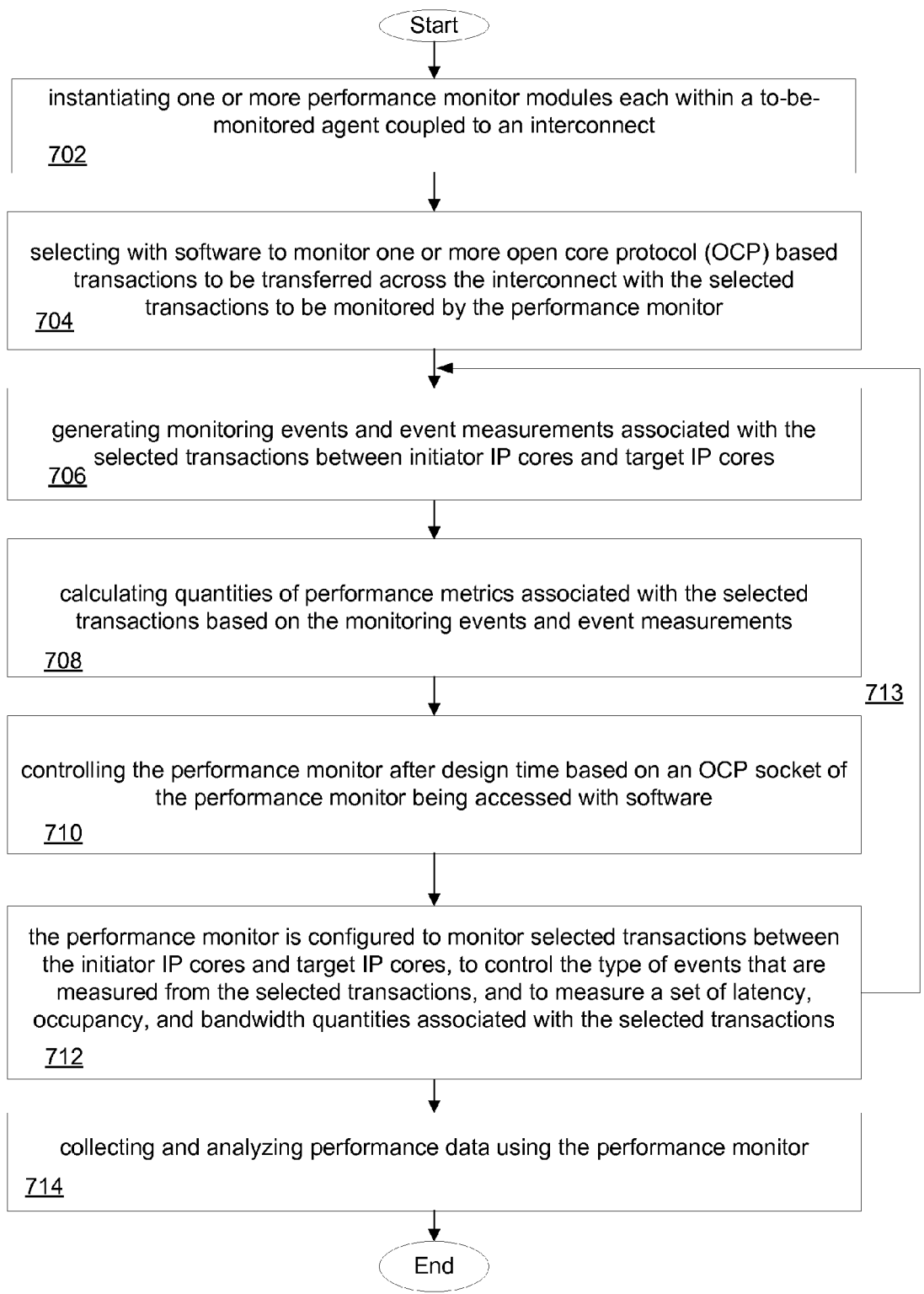
FIG. 7 illustrates a flow chart of an embodiment of operations of a performance monitor.

FIG. 7 illustrates a flow chart of an embodiment of a method of operating performance monitor. The method includes instantiating one or more performance monitor modules each within a to-be-monitored agent coupled to an interconnect at block 702. The method further includes selecting open core protocol (OCP) based transactions to be transferred across the interconnect with the selected transactions to be monitored by the performance monitor at block 704. The method further includes generating monitoring events and event measurements associated with the selected transactions between initiator IP cores and target IP cores at block 706. The method further includes calculating quantities of performance metrics associated with the selected transactions based on the monitoring events and event measurements at block 708. The method further includes controlling the performance monitor after design time based on an OCP socket of the performance monitor being accessed with software at block 710. The performance monitor is configured to monitor selected transactions between the initiator IP cores and target IP cores, to control the type of events that are measured from the selected transactions, and to measure a set of latency, occupancy, and bandwidth quantities associated with the selected transactions at block 712. The method further includes collecting and analyzing the performance data using the performance monitor at block 714. It is also possible that after re-programming the performance monitor using software at block 712, another round of measurements need to be executed, e.g., by going from block 712 back to block 706 again through flow 713.

The performance monitor may be located at an Open Core Protocol socket and configured to do hardware performance measurement of the OCP socket. The socket being the set of wires and protocol at the interface between two components such as an interconnect and a IP core. The performance monitor can be configured to monitor selected transactions between the initiator IP cores and target IP cores. The performance monitor can be configured to control the type of events that are measured from the selected transactions. The performance monitor can be configured to measure parameters at any point between two cores. The parameters include a set of latency, occupancy, and bandwidth quantities associated with the selected transactions. The selected transactions can be Open Core Protocol based transactions.

The performance monitor has built in logic and hardware storage to monitor either event-set or interval type measurements using the same software interface and the software directs the performance monitor on which measurements to monitor. Thus, the monitor has both capabilities built within and uses the same reg set and software interface.

The hardware architecture of the performance monitor and the performance analysis model for OCP are discussed. A configurable RTL generator for the performance monitor is further discussed with many other aspects below.

Figure 8:
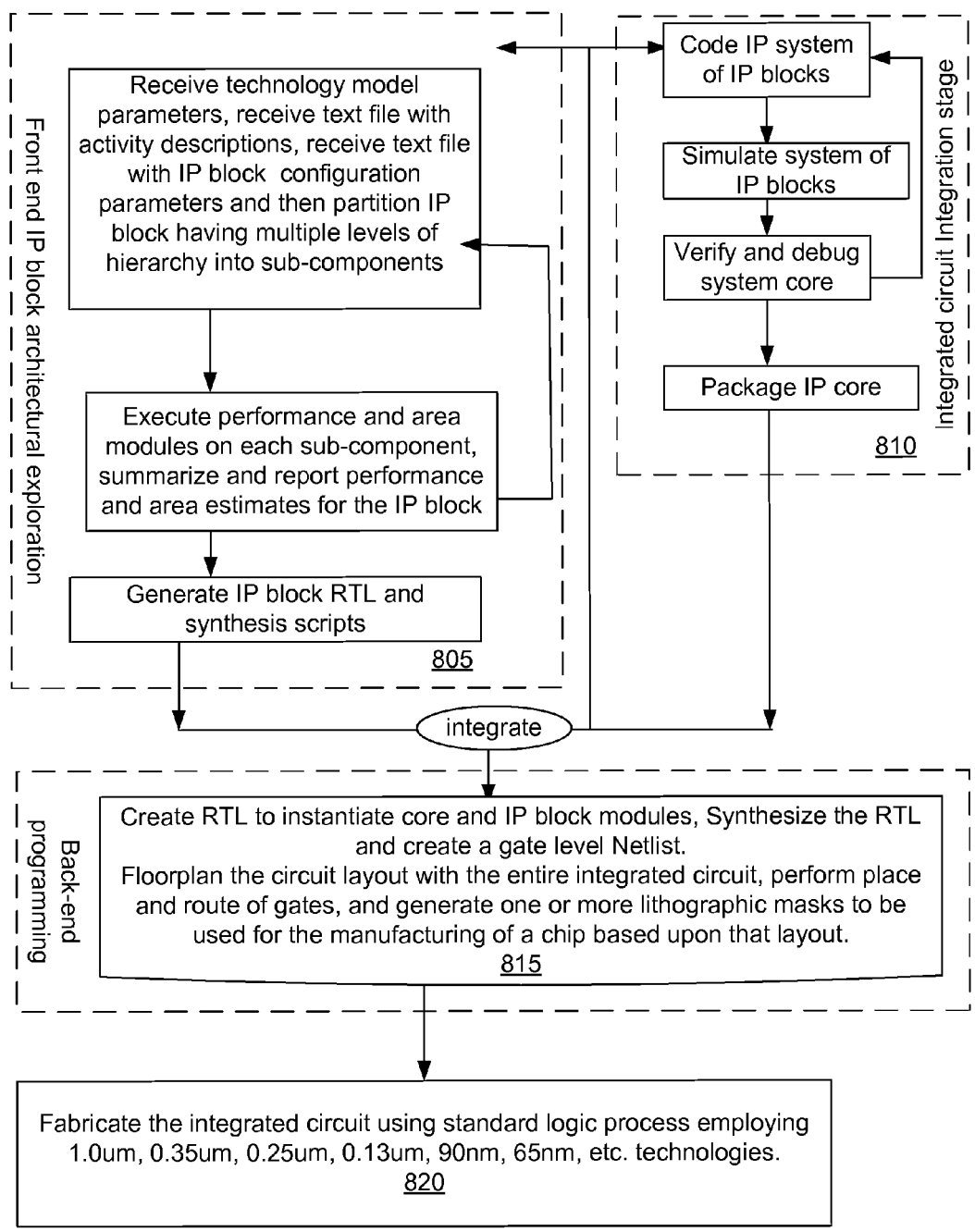
FIG. 8 illustrates a flow diagram of an embodiment of an example of a process for generating a device, such as a System on a Chip, with the designs and concepts discussed above for the interconnect.

FIG. 8 illustrates a flow diagram of an embodiment of an example of a process for generating a device, such as a System on a Chip, with the designs and concepts discussed above for the Interconnect of the device. The example process for generating a device from designs of the Interconnect may utilize an electronic circuit design generator, such as a System on a Chip compiler, to form part of an Electronic Design Automation (EDA) toolset. Hardware logic, coded software, and a combination of both may be used to implement the following design process operations using an embodiment of the EDA toolset. The EDA toolset such may be a single tool or a compilation of two or more discrete tools. The information representing the apparatuses and/or methods for the circuitry in the Interconnect, etc may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses and/or methods described herein.

Aspects of the above design may be part of a software library containing a set of designs for components making up the Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 805, the EDA tool set may receive a user-supplied text file having data describing configuration parameters and a design for at least part of an individual intellectual property (IP) block having multiple levels of hierarchy. The data may include one or more configuration parameters for that IP block. The IP block description may be an overall functionality of that IP block such as an interconnect. The configuration parameters for the interconnect IP block may be number of address regions in the system, system addresses, how data will be routed based on system addresses, etc.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 810, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated.

The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 815, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 820, a fabrication facility may fabricate one or more chips with the signal generation circuit utilizing the lithographic masks generated from the EDA tool set's circuit design and layout. A prototype of an integrated circuit with an interconnect having one or more performance monitors may be fabricated. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs As discussed, an EDA tool set may be implemented in software as a set of data and instructions, such as an Instance in a software library callable to other programs or an EDA tool set consisting of an executable program with the software cell library in one program, stored on a machine-readable medium. A machine-readable storage medium may include any mechanism that provides (e.g., stores and/or transmits) information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The modeling tool may have its instructions, executable code sequences, data files, etc stored on a machine-readable storage medium. A machine-readable storage medium may include any mechanism that provides (e.g., stores and/or transmits) information in a form readable by a machine (e.g., a computer). For example, a machine-readable medium may include, but is not limited to: read only memory (ROM); random access memory (RAM); magnetic disk storage media; optical storage media; flash memory devices; DVD's; electrical, optical, digital signals); EPROMs; EEPROMs; FLASH, magnetic or optical cards; or any other type of media suitable for storing electronic instructions.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, most functions performed by electronic hardware components may be duplicated by software emulation. A system on a chip design having one or more performance monitors implemented in a fabricated integrated circuit would include that system on a chip design mapped into a Field Programmable Gate Array. The interconnect is a communication bus that includes shared buses as well as point to point sockets. Thus, a software program written to accomplish those same functions may emulate the functionality of the hardware components. The hardware logic consists of electronic circuits that follow the rules of Boolean Logic, software that contain patterns of instructions, or any combination of both. The invention is to be understood as not limited by the specific embodiments described herein, but only by scope of the appended claims.

What is claimed is:

1. A performance monitoring apparatus, comprising:
an event measurement module that includes
an event generator sub-module to generate monitoring events and event measurements associated with transactions between initiator IP cores and target IP cores implemented in an system on a chip design implemented in a fabric integrated circuit,
a first software visible register block to provide software access for controlling the event measurement module regarding one or more transactions to monitor and to configure one or more parameters associated with that transaction to track, as well as
a filtering sub-module to select transactions to be monitored based on information received from the software, where the event measurement module includes the event generator sub-module, the first software visible register block, as well as the filtering sub-module; and
a performance counter module communicatively coupled to the event measurement module to form the performance monitoring apparatus that is located on the system on a chip design implemented in the fabricated integrated circuit, wherein the performance counter module to aggregate events and event measurements received from the event measurement module into quantities of performance metrics associated with transactions between initiator IP cores and target IP cores over the interconnect.

2. The performance monitoring apparatus of claim 1, further comprising:
a second software visible register block located in the performance counter module to provide software access for controlling the performance counter module.

3. The performance monitoring apparatus of claim 2, wherein the performance counter module is configured to access and check the first software visible register block in order to monitor indicated transfers and transactions between the plurality of initiator IP cores and target IP cores and the performance monitor is located internal to an interconnect to monitor parameters of transactions occurring at that location internal to the interconnect in the system on a chip design in the fabricated integrated circuit.

4. The performance monitoring apparatus of claim 3, wherein the performance counter module is configured to access and control the first software visible register block in order to determine the type of events that are measured from those indicated transfers and transactions.

5. The performance monitoring apparatus of claim 1, wherein the performance counter module is configured thru the first software visible register block to measure a set of latency, occupancy, and bandwidth quantities associated with transaction performance and the performance monitoring apparatus provides an on-chip, programmable hardware device for monitoring and debugging various parameters, including latency, occupancy, FIFO queue utilization, and bandwidth of transactions occurring between initiator IP cores and target IP cores over the interconnect.

6. The performance monitoring apparatus of claim 1, wherein the performance counter module further comprises:
a first counter to determine how many events of a specified event type are measured;
a second counter to determine a measurement interval by calculating an elapsed time in terms of clock cycles for a measurement; and
a third counter to determine a number of clock cycles during the measurement interval that the specified event type was present.

7. The performance monitoring apparatus of claim 1, wherein the performance monitor is located at an Open Core Protocol socket and is configured to monitor selected transactions between the initiator IP cores and target IP cores, to control the type of events that are measured from the selected transactions, and to measure a set of latency, occupancy, and bandwidth quantities associated with the selected transactions, where the selected transactions are Open Core Protocol based transactions.

8. The performance monitoring apparatus of claim 1, wherein the performance monitor has built in logic and hardware storage to monitor either event-set or interval type measurements using the same software interface and the software directs the performance monitor on which measurements to monitor.

9. The performance monitoring apparatus of claim 1, wherein each event generator sub-module has protocol logic configured to understand a protocol and various signal lines used in an interconnect in the System on a Chip, so the logic can recognize one or more patterns occurring by data values carried in the signal lines, comparator logic to match these patterns when the pattern occurs, and communication logic configured to communicate to the performance counter module that a monitored for event corresponding to the pattern has indeed occurred.

10. The performance monitoring apparatus of claim 1, further comprising:
    latency measurement logic located in an interconnect in the system on chip configured to make an average latency measurement of average request to response latency for two or more transactions without doing estimations.

11. The performance monitoring apparatus of claim 1, further comprising:
    latency measurement logic located in an interconnect in the system on chip configured to make a throughput measurement and resource utilization measurement for two or more transactions without doing estimations.

12. A performance monitoring system, comprising:
    a plurality of initiator agents associated with a plurality of initiator IP cores;
    a plurality of target agents associated with a plurality of target IP cores with the plurality of initiator and target IP cores being communicatively coupled via an interconnect of an electronic design;
    a first performance monitor that is configurable after design time of the electronic design to monitor transactions between the plurality of initiator IP cores and target IP cores, wherein the first performance monitor includes an event measurement module that includes
        an event generator sub-module to generate monitoring events and event measurements associated with transactions between the plurality of initiator IP cores and target IP cores;
        a filtering sub-module to select transactions to be monitored; and
    a performance counter module coupled to the event measurement module, wherein the performance counter module to aggregate events and event measurements received from the event measurement module into quantities of performance metrics.

13. The performance monitoring system of claim 12, wherein the performance counter module is configured to access and control a software visible register block in order to monitor desirable transfers and transactions between the plurality of initiator and target and to control the type of events that are measured from those desirable transfers and transactions.

14. The performance monitoring system of claim 12, wherein the performance counter module is configured to measure a set of latency, occupancy, and bandwidth quantities associated with transaction performance.

15. The performance monitoring system of claim 12, wherein the first performance monitor is instantiated within an initiator agent and a second performance monitor is instantiated within a target agent, the first performance monitor receives request signals, data signals, and response signals from an initiator, and the first performance monitor and second performance monitor are used to generate a register transfer level (RTL) model of the transactions.

16. The performance monitoring system of claim 12, wherein the first performance monitor, after each event-set or time-interval measurement, is configured to reach a stopped state that leaves all measurements static waiting to be accessed by software.

17. The performance monitoring system of claim 16, wherein a software agent who knows a data word size and an operating frequency accesses the event measurement module and the performance counter module to calculate desirable performance matrices quantitatively.

18. The performance monitoring system of claim 12, wherein the performance counter module comprises:
    a command register to specify and control performance measurements associated with the transactions;
    a status register to monitor ongoing measurements;
    a results register to store measurement results; and
    an interval register to store measurement intervals.

19. The performance monitoring system of claim 12, wherein the first performance monitor is configured after being synthesized into hardware to measure a filtered subset of transactions occurring between the plurality of agents and target IP cores.

20. The performance monitoring system of claim 12, wherein the filtering sub-module is configured to select transactions to be monitored after design time based on at least one of transaction type, command type, thread identification, tag identification, address space, and associated request information.

21. A method for an integrated circuit, comprising:
    instantiating a performance monitor within an agent coupled to an interconnect;
    selecting with software to monitor one or more open core protocol (OCP) based transactions to be transferred across the interconnect with the selected transactions to be monitored by the performance monitor;
    generating monitoring events and event measurements associated with the selected transactions between initiator IP cores and target IP cores based on information from the software; and
    calculating quantities of performance metrics associated with the selected transactions based on the monitoring events and event measurements, where the above method is implemented with 1) hardware logic, 2) software instructions, and 3) any combination of both, and any portion implemented through software instructions is done so by instructions stored on a non-transitory machine readable medium that stores the instructions in an executable format.

22. The method of claim 21, further comprising:
    controlling the performance monitor after design time based on an OCP socket of the performance monitor being accessed with software, wherein the performance monitor is configured to monitor selected transactions between the initiator IP cores and target IP cores, to control the type of events that are measured from the selected transactions, and to measure a set of latency, occupancy, and bandwidth quantities associated with the selected transactions.

23. A non-transitory machine readable medium storing executable program instructions which when executed is configured to cause a machine to perform the method of claim 21.

24. The method of claim 21, wherein the performance monitor also contains a set of software controllable registers used to specify the type of events to be measured, and registers to control the measurements.

25. The method of claim 24, wherein the set of registers includes a command register that specifies and control performance measurements associated with the transactions, a status register that monitors ongoing measurements, a results register to store measurement results, and an interval register to store measurement intervals.

* * * * *